(12) United States Patent
Arai et al.

(10) Patent No.: US 7,141,189 B2
(45) Date of Patent: Nov. 28, 2006

(54) SOLUTION CASTING PROCESS FOR PRODUCING POLYMER FILM

(75) Inventors: Toshinao Arai, Minami-Ashigara (JP); Hidekazu Yamazaki, Minami-Ashigara (JP); Hitoshi Ikeda, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 217 days.

(21) Appl. No.: 10/657,090

(22) Filed: Sep. 9, 2003

(65) Prior Publication Data
US 2004/0046272 A1   Mar. 11, 2004

(30) Foreign Application Priority Data
Sep. 10, 2002 (JP) ............................ 2002-264312

(51) Int. Cl.
*B29C 41/26* (2006.01)

(52) U.S. Cl. .......................... 264/28; 264/85; 264/216; 264/234

(58) Field of Classification Search ................. 264/28, 264/85, 216, 234
See application file for complete search history.

(56) References Cited

U.S. PATENT DOCUMENTS 6,660,211 B1 * 12/2003 Topolkaraev et al. ........ 264/444

FOREIGN PATENT DOCUMENTS

| JP | A 10-45917 | 2/1998 |
|----|------------|--------|
| JP | A 2001-294667 | 10/2001 |

* cited by examiner

*Primary Examiner*—Suzanne E. McDowell
(74) *Attorney, Agent, or Firm*—Young & Thompson

(57) ABSTRACT

Cellulose triacetate film is produced by a solution casting process. Dope, which includes cellulose triacetate and mixed solvent with methyl acetate, is cast on a rotary drum in a form of bead by use of a flow casting die, to form gel film. When a self-supporting characteristic of the gel film becomes higher than one limit value, the gel film is stripped from the rotary drum by use of a stripping roller, to obtain the cellulose triacetate film. During the casting step, a surface of the rotary drum is cooled at −10° C. or lower.

27 Claims, 3 Drawing Sheets

SOLUTION CASTING PROCESS FOR PRODUCING POLYMER FILM

BACKGROUND OF THE INVENTION

1. Field of the Invention

The present invention relates to a solution casting process for producing polymer film. More particularly, the present invention relates to a solution casting process in which polymer film can be produced at a high efficiency and stability.

2. Description Related to the Prior Art

Cellulose acylate film as polymer film, for example cellulose triacetate (TAC) film, is produced by a solution casting process, and widely used in a liquid crystal display panel, photosensitive material, and the like. Today, the liquid crystal display panel has been marketed more and more widely. So the production of the polymer film is required to have higher efficiency. For example, a casting speed of the solution casting process is desired to be higher. A thickness of the polymer film is desired to be smaller. To obtain the TAC film as the polymer film, at first the cellulose triacetate is dissolved in a mixed solvent of which a main component is dichloro methane, to prepare polymer solution or dope. The dope is cast on a support, to form gel film. The gel film is dried on the support to come to obtain a self-supporting characteristic, before the gel film is stripped from the support to obtain the polymer film. This is a widely known method of the solution casting process.

Due to social requirement, it is strongly suggested to reduce or suppress the use of dichloro methane as chlorine-containing solvent in particular in consideration of protection of environment. One suitable substitute is a mixed solvent including methyl acetate as a main composition because of considerably low influence to the environment. However, comparison according to experiments has resulted in somewhat difficulty in strengthening the cooled gel if the dope is prepared from the mixed solvent of the methyl acetate type in comparison with the dope prepared from the dichloro methane solvent. There arises a problem in that the gel film does not have a sufficient self-supporting characteristic even by casting of the dope on the support. JP-A 10-045917 and 2001-294667 suggest the solution casting process according to casting in a cooled manner in which the support is cooled to promote gelling of the gel film cast on the support, and stripping of the gel film is facilitated.

However, the casting process in the cooled manner still has a problem in a reduced strength of the polymer film sufficient for the stripping after the imparting of the self-supporting characteristic to the gel film according to casting and gelling on the support. This is typically because of rise in the casting speed and the reduction of the thickness of the polymer film. As the insufficiency occur in the strength of the polymer film upon stripping, non-stripped remainder of the gel film occurs on a surface of the support. Furthermore, an upper shift of a stripping line occurs to influence stability in the feeding. Also, dew condensation is likely to occur on the support due to forced cooling of the support. Gasified solvent in the air is changed to liquid again, and also deposits the support due to the cooling. Those problems are harmful to continuous operation for casting.

SUMMARY OF THE INVENTION

In view of the foregoing problems, an object of the present invention is to provide a solution casting process for producing polymer film in which gel film can be stripped from a support stably and continuously after preparation of dope of solvent particularly of methyl acetate, and in which casting can be possible at a high casting speed for a reduce thickness of the polymer film.

In order to achieve the above and other objects and advantages of this invention, a solution casting process is provided, in which dope including polymer and solvent is cast on a support in a form of bead by use of a flow casting die, to form gel film. When a self-supporting characteristic of the gel film becomes higher than one limit value, the gel film is stripped from the support by use of a stripping roller, to obtain polymer film. During the casting step, a surface of the support is cooled at −10° C. or lower.

The support is constituted by a rotary drum. In the cooling step, anti-freezing heat medium is used and caused to flow in a flow path formed through the rotary drum.

The anti-freezing heat medium is coolant of at least one of a glycol type, a fluorine type, and an alcohol type.

The support is formed from material with low-temperature brittleness.

The material with the low-temperature brittleness comprises at least one of SUS steel, SLA steel and STPL steel.

Furthermore, anti-condensation gas is blown over a bead back surface of the bead, to lower density of gaseous solvent gasified from the solvent in a vicinity of a landing line where the bead is landed to the support, so as to suppress re-condensation of the gaseous solvent.

In the gas blowing step, a dew point is set lower than a temperature of the support by at least 1° C.

The anti-condensation gas is nitrogen or helium.

The anti-condensation gas flows at a flow rate of 0.5–2 m/s.

The anti-condensation gas has a temperature of 30–50° C.

Furthermore, heating gas is blown over a standby region that is defined on the support without the gel film and between a landing line where the bead is landed to the support and a stripping line where the gel film is stripped from the support, for setting a temperature of the standby region higher than a dew point, so as to prevent condensation of dew.

The heating gas has a temperature of 50–100° C.

Furthermore, the solvent is condensed and withdrawn in a gaseous form gasified from the gel film at a predetermined temperature that is set lower than a surface temperature of the polymer film by at least 1° C.

The support is rotatable about a rotational shaft. Furthermore, coolant is sent to the support. Warming gas is blown over the rotational shaft or a vicinity thereof in the support, for setting a temperature of the rotational shaft higher than a dew point, to prevent condensation of dew.

The warming gas has a temperature of 20–30° C.

The stripping roller strips the gel film from the support at film stress of 450,000 Pa or more.

The support is rotatable, and the support and the stripping roller satisfy a condition of:

$$1.001 \leq V1/V0 \leq 1.5$$

where $V0$ is a peripheral speed of the support, and $V1$ is a peripheral speed of the stripping roller.

The support and the stripping roller satisfy a condition of:

$$1 \text{ mm} \leq C1 \leq 100 \text{ mm}$$

where $C1$ is a clearance between the stripping roller and the support to strip the gel film.

A difference in surface energy between the support and the dope is $3 \times 10^{-2}$ N/m or more.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

[Solvent]

Figure 1:
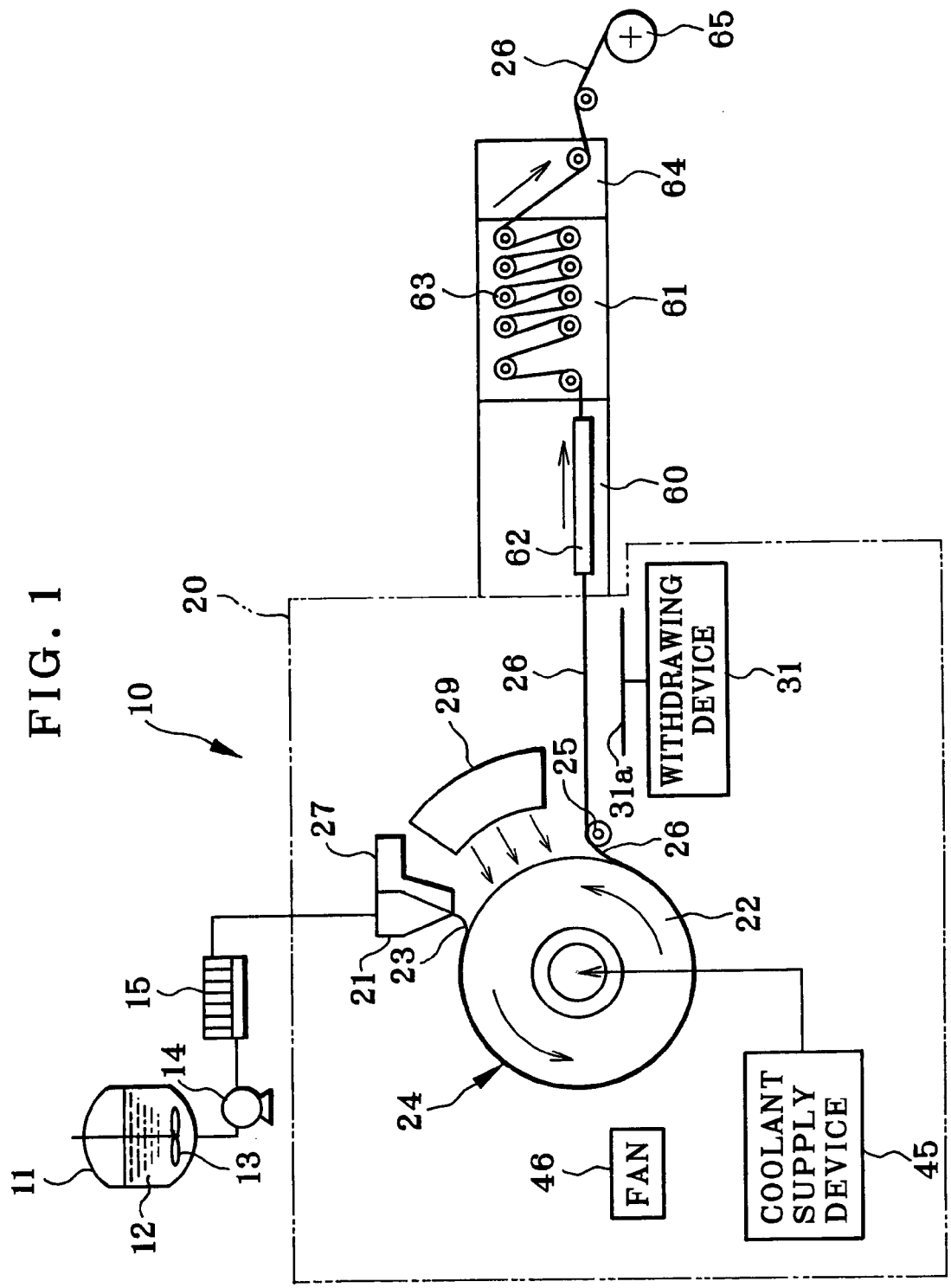
FIG. 1 is an explanatory view in elevation, illustrating a film producing line according to a solution casting process of the invention.

Solvent for preparing dope for use in the solution casting process of the invention may be any suitable known type in the field of solvent. Examples of solvents include halogenated hydrocarbons, such as dichloro methane (methylene chloride); esters, such as methyl acetate; ethers; alcohols, such as methanol, ethanol, and n-butanol; and ketones, such as acetone. Also, it is possible to prepare dope by mixing two or more types of solvents, for the purpose of forming polymer film. In particular, it is preferable in the invention to use mixed solvent of which a main component is methyl acetate.

[Polymer]

Any suitable polymers may be used in the present invention. A particularly preferred examples are cellulose acylates. A desirable example of cellulose acylate is cellulose triacetate (TAC) of which a ratio of acetylation is 59.0–62.5%. The TAC film being used, an optical film, polarizing plate and liquid crystal display panel are characteristically excellent in view of optical performance and stability in dimensions.

[Additives]

Additives of any suitable known types may be mixed with the dope. Examples of the additives include plasticizers such as triphenyl phosphate (TPP), and biphenyl diphenyl phosphate (BDP); ultraviolet absorbers such as oxy benzophenone compounds, and benzo triazole compounds; matte materials such as silicon dioxide; thickeners; and oil gelling agents. Any of those can be mixed with the polymer at the time of preparing the dope. Otherwise, additives can be mixed after the preparation of the dope in a manner of the in-line mixture by use of a static type of mixer during the transfer of the dope. Note that a term of the solid component is used herein to refer to a combination of the polymer and the additives.

[Preparation of Dope]

The above-described solid component inclusive of the polymer and additives is added to the methyl acetate solvent, and dissolved by any of known dissolving methods, to prepare dope. In general, the dope is filtrated to eliminate foreign material. For the purpose of the filtration, it is possible to use filter paper, filter cloth, non-woven fabric, metallic mesh, sintered metal, porous plate, and other known filter mediums. The filtration can eliminate undissolved material in the dope as well as foreign material. Failure or occurrence of defects can be avoided when polymer film as product is completed.

Furthermore, it is possible after the preparation to heat the dope for the purpose of raising solubility. Examples of methods of heating include heating in stirring the dope in a stationarily disposed tank, and heating in transferring the dope by use of a multi-pipe heat exchanger, a heat exchanger of a jacket pipe with a stationary mixer, or other heat exchangers. Also, a cooling step for cooling the dope may be added after the heating step. In addition, the inside of the device may be pressurized to heat the dope to a temperature higher than its boiling point. According to those steps, undissolved material of fine particles can be dissolved completely. It is possible to reduce an amount of foreign material of film, and reduce load of the filtration.

In the present embodiment, the solid component is included in the dope at an amount of 15–30 wt. %, and preferably 20–25 wt. %. Should the amount be less than 15 wt. %, the solid component is at too small an amount, so very long time is required until film stress can suitably increase high in the gel film formed from the dope. This is likely to cause a high manufacturing cost. Also, another shortcoming lies in possibility in failure of forming the gel film upon casting of the dope. In contrast, should the amount of the solid component be more than 30 wt. %, the dope will have too high viscosity, to raise difficulty in a leveling effect or smoothing of the bead. The polymer film will be difficult to form in a uniform manner.

[Solution Casting Process]

Figure 2:
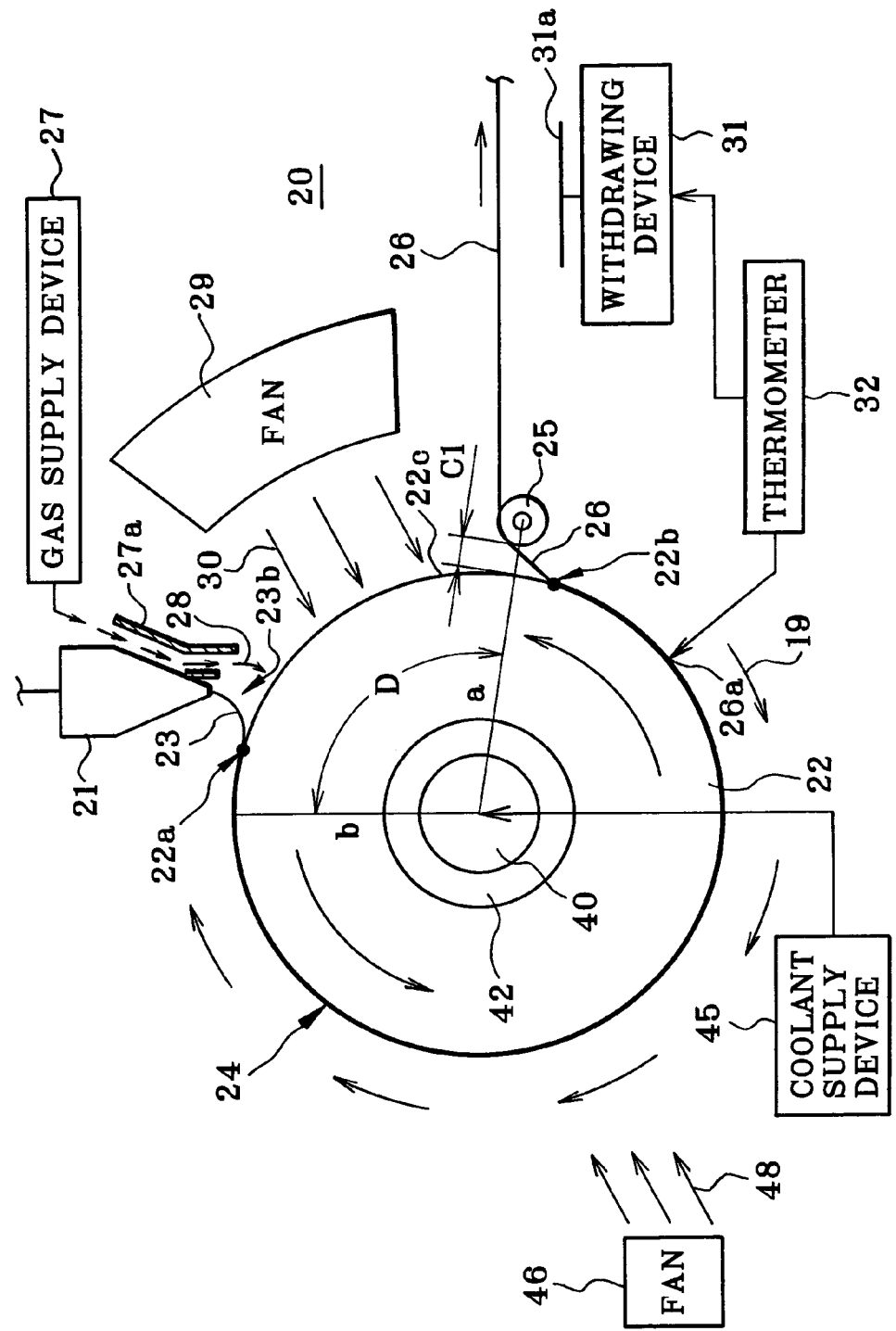
FIG. 2 is an explanatory view in elevation, illustrating the film producing line specifically with a rotary drum, a coolant supply device and a fan.
Figure 3:
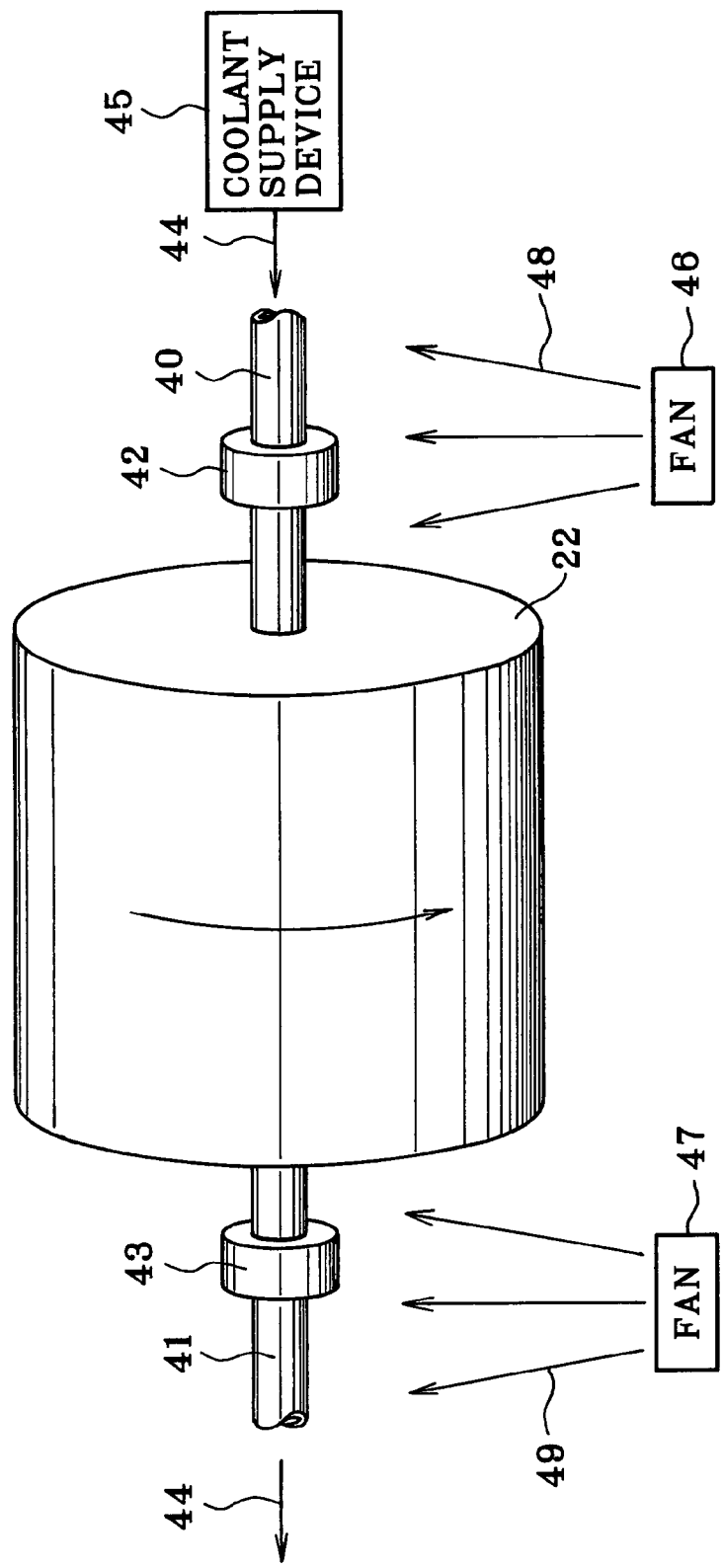
FIG. 3 is an explanatory view in perspective, illustrating the rotary drum together with the coolant supply device and fans.

In FIG. 1, a film producing line 10 for a solution casting process of the invention is schematically illustrated. In FIGS. 2 and 3, important portions of the film producing line 10 are illustrated. Dope 12 prepared by the above-described process is contained in a mixing tank 11. A stirring wing 13 stirs the dope 12 to uniformize the same. A supply pump 14 sends the dope 12 to a filtration device 15, where foreign material is eliminated from the dope 12. After this, the dope 12 is sent at a constant flow rate to a flow casting die 21 disposed in a casting chamber 20. A rotary drum 22 as support with low-temperature brittleness is disposed under the flow casting die 21. There is a drive mechanism (not shown) which causes the rotary drum 22 to rotate. The dope 12 is cast by the flow casting die 21 to the rotary drum 22 in a form of bead 23. Note that, in FIG. 2, a term of a landing line 22a is used to refer to a position of landing of the bead 23 on the rotary drum 22. In the drawing, the landing line 22a is indicated by a point because the landing line 22a is viewed perpendicularly to the movement of a surface of the bead. The bead 23 is gradually gelled on the rotary drum 22 as a support, to form gel film 24. When the gel film 24 moves according to rotation of the rotary drum 22, the gel film 24 is cooled to raise the degree of gelling. When the gel film 24 comes to a stripping line 22b of FIG. 2, a stripping roller 25 peels the gel film 24 from the rotary drum 22, to form polymer film 26. Note that drying air 19 can be preferably sent by a fan or blower (not shown) in a direction opposite to a rotational direction of the rotary drum 22.

In FIG. 3, rotational shafts 40 and 41 are attached to the rotary drum 22. There are bearings 42 and 43 connected with the rotational shafts 40 and 41, and used for installation in a casting apparatus (not shown) for rotational actuation. There are coolant flow paths (not shown) formed in respectively the rotational shaft 40, the rotary drum 22 and the rotational shaft 41. Coolant 44 as anti-freezing heat medium is supplied by a coolant supply device 45, caused to flow through the coolant flow paths, and cools the rotary drum 22. Note that the surface temperature of the rotary drum 22 is −10° C. or lower, preferably −30° C. or lower, and desirably −50° C. or lower. However, the rotary drum 22 according to the present invention may be set at a temperature different from those ranges.

Examples of the coolant 44 include glycol types, fluorine types, alcohol types and the like. The most desirable examples of the coolant 44 are FLUORINERT FC-77 (trade name), HFE 7100 (trade name), and COLD BRINE FP60 (trade name). Furthermore, any suitable methods for cooling the rotary drum may be used in a manner different from the use of the coolant as illustrated in FIG. 3.

The rotary drum 22 used herein is preferably formed from material with low-temperature brittleness, which is effective in preventing a drop of resistance to shock of equipments, load of repeated uses and the like in cooling at a low temperature. Preferable examples of materials with low-temperature brittleness include SUS steel, SLA steel and STPL steel.

As illustrated in FIG. 2, it is preferable for the flow casting die 21 to have a gas supply path 27a, which is disposed on a side of a bead back surface 23b and connected with a gas supply device 27. Anti-condensation gas or first gas 28 is sent through the gas supply device 27 to blow the bead back surface 23b. This is effective in lowering density of gas at the bead back surface 23b, and dropping the dew point. It is possible to prevent dew condensation on the surface of the rotary drum 22. Degradation of the surface quality of the polymer film 26 can be suppressed. Should dew condensation occur on the rotary drum 22, forming of the gel film 24 will result in a drop of the gel film 24 from the rotary drum 22 between the landing line 22a and the stripping line 22b. This will be harmful to continuous operation of forming the gel film 24. According to the invention, dew condensation on the surface of the rotary drum 22 can be prevented, so as to prevent the gel film 24 from dropping. Note that preferred examples of the anti-condensation gas 28 include nitrogen, helium and other rare gases which do not influence the characteristics of the polymer film 26.

Also, the gas supply device 27 operates before sending the anti-condensation gas 28 to the bead back surface 23b. The gas supply device 27 is effective in adjusting the temperature of the anti-condensation gas 28 in such a manner that a dew point is lower than the surface temperature of the rotary drum 22 by at least one (1) degree centigrade. To measure the surface temperature of the rotary drum 22, any types of thermometers known in the art may be used. In the drawing, the thermometer is not shown. Should the temperature difference be smaller than one (1) degree centigrade, dew condensation will occur according to fine changes in the casting process. Furthermore, the anti-condensation gas 28 can flow at a flow rate in a range of 0.5–2 m/s. Should the flow rate be lower than 0.5 m/s, an effect of lowering the gas density in the vicinity of the bead 23 will be insufficient. Should the flow rate be higher than 2 m/s, it is likely that unevenness will occur in a gas flow about the bead 23. Quality of the obtained polymer film will be low in relation to its surfaces. The temperature of the anti-condensation gas 28 is preferably in a range of 30–50° C. However, other conditions of the equipments in the embodiment may be changed, so the anti-condensation gas 28 can have a flow rate and temperature not included in these preferred ranges.

The dope 12 cast on the rotary drum 22 is cooled and gelled to raise film strength of the gel film 24. The gel film 24 is dried until being stripped, to raise the film strength further. Should the film stress be 450,000 Pa or lower according to extension of the gel film 24 at the stripping time, the film strength will be too low, and no self-supporting characteristic will be obtained at a level sufficient for the stripping. Consequently, the value of the stress according to the extension is 450,000 Pa or more, preferably 600,000 Pa or more, and desirably 750,000 Pa or more. Note that a value of the stress due to the extension of the film is measured by a load cell for the extension.

Let V0 be a peripheral speed of the rotary drum 22. Let V1 be a peripheral speed of the stripping roller 25. When the gel film 24 is stripped as the polymer film 26, it is preferable to determine a speed ratio between the speeds V0 and V1 in a range of:

$$1.001 \leq V1/V0 \leq 1.5,$$

preferably, $$1.002 \leq V1/V0 \leq 1.3,$$

and desirably, $$1.005 \leq V1/V0 \leq 1.2.$$

By determining the speed ratio V1/V0 in this manner, force of the extension of the polymer film is kept sufficient to stabilize the stripping operation. Should the speed ratio be smaller than 1.001, the force of the film extension will be insufficient. The stripping line 22b is positioned too high, and raises difficulty in regularly stripping the polymer film. Should the speed ratio be greater than 1.5, breakage or wrinkles will occur at selvedges due to the abrupt extension of the highly volatile soft film immediately after the stripping. Of course, the speed ratio V1/V0 in the present invention may be determined differently from this preferred range.

If the shortest distance or clearance C1 between the rotary drum 22 and the stripping roller 25 is set small, the speed of the extension rises, so the stripping is stabilized by the rise in the force of the extension. However, should the clearance C1 be less than 1 mm, it is likely that film dust or other foreign material will block the clearance to break the polymer film accidentally. In contrast, should the clearance C1 be more than 100 mm, an effect of raising the force of the extension decreases. A position of the stripping is too high, and lowers the stability of the stripping. Therefore, the clearance C1 preferably satisfies the condition of 1 mm≦C1≦100 mm. Note that the term of the clearance C1 is used herein to mean a distance between an intersection point of a line a and the periphery of the rotary drum 22 and an intersection point of the line a and the periphery of the stripping roller 25, wherein the line a is defined to pass the center of the rotary drum 22 and the center of the stripping roller 25. Let a reference line b be a straight line extending vertically from the center of the rotary drum 22. Let an angle D be defined between the line a and the reference line b. The stripping roller 25 is disposed so that the angle D is 45–180°, and preferably 60–120°.

To facilitate the stripping of the gel film 24 from the rotary drum 22, a difference between surface tension of the rotary drum 22 and that of the dope 12 is preferably $3 \times 10^{-2}$ N/m or more. This is effective in reducing wettability of the rotary drum 22 with the solvent. An area of contact between the gel film 24 and the rotary drum 22 is kept small. Therefore, the stripping operation is kept stable because of lowering the resistance in stripping. To measure the surface tension according to the invention, any of known measuring methods may be used. Also, a difference between the surface tensions may be determined differently from this preferred range.

In FIG. 2, the gel film 24 does not exist between the stripping line 22b and the landing line 22a on the rotary drum 22. This region without the gel film 24 on the rotary drum 22 is herein referred to as a standby region 22c. As described above, coolant is supplied through the rotary drum 22 to cool the rotary drum 22. If the surface temperature of the standby region 22c comes down to the dew point, dew condensation is likely to occur. As the rotary drum 22 has an endless structure, casting of the dope 12 to portions having water droplets or condensed solvent is likely to cause failure on the film in a considerably large area. Accordingly, a fan or blower 29 is used to blow heating gas or second gas 30 over the standby region 22c. The heating gas 30, for example air, raises the temperature of the standby region 22c higher than the dew point of the vicinity of the bead 23 by one (1) degree centigrade. This is effective in preventing deposition of water droplets or condensed solvent in a liquid form. Note that the heating gas 30 preferably has the temperature of 50–100° C., and sent at a flow rate of 2–10 m/s.

In FIG. 3, the coolant 44 is caused to flow inside the rotational shafts 40 and 41. When the temperature of air around the rotational shafts 40 and 41 and the bearings 42 and 43 is lowered by cooling with the coolant 44, and becomes down to the dew point, vapor in the air is condensed to create droplets of water. Also, gasified solvent from the dope 12 is included in gas inside the casting chamber 20. It is likely that the solvent is condensed again and liquefied, and deposits on the rotational shaft 40 or 41 or the bearing 42 or 43. Failure in the rotation may occur according to the deposit, seriously to influence the continuous casting. In view of this situation, fans or blowers 46 and 47 are installed near to the rotational shafts 40 and 41 and the bearings 42 and 43. Warming gas or third gas 48 and 49, for example air, is sent by the fans 46 and 47 to the rotational shafts 40 and 41 and the bearings 42 and 43, in order to prevent condensation of dew on surfaces of elements including the rotational shafts 40 and 41 and the bearings 42 and 43. Note that the temperature of the warming gas 48 and 49 can be any value in a range of keeping the temperature of the rotational shafts 40 and 41 higher than the dew point. However, a preferable temperature of the warming gas 48 and 49 is in a range of 20–30° C. A flow rate of the warming gas 48 and 49 is in a preferable range of 2–10 m/s. Furthermore, a structure of the fan may be different from that depicted in FIG. 3. In FIG. 3, the fans 46 and 47 are disposed for respectively the rotational shafts 40 and 41. However, a single fan or blower can be used for sending gas to the rotational shafts 40 and 41.

The casting chamber 20 is used to contain the flow casting die 21 and the rotary drum 22 for the purpose of the solution casting process of the invention. This is preferable to suppress flows of air to the bead 23 in random directions, so the polymer film 26 with uniformized surfaces can be obtained with high quality. However, dew condensation is likely to occur in the casting chamber 20, to deposit water droplets on the gel film 24. Streaks or other defects will occur on the surface of the polymer film. If the water or liquid is deposited and condensed on a surface of any of the rotational shafts 40 and 41 and the bearings 42 and 43 (See FIG. 3), the control of rotation of the rotary drum 22 will become extremely difficult for a rotational speed. Moreover, irrecoverable failure in rotation of the rotary drum 22 is likely to occur. In consideration of this, a solvent withdrawing device 31 is preferably disposed in the casting chamber 20 for condensing and withdrawing the gasified solvent.

A condensing surface 31a is included in the solvent withdrawing device 31, for condensing vapor from the air in the casting chamber 20, and/or gasified solvent created from the solvent in the gel film 24. The temperature of the condensing surface 31a may be any value, and can be set according to the type of the solvent constituting the dope 12. In the present invention, the temperature of the condensing surface 31a is lower than the surface temperature of the polymer film 26 by at least one (1) degree centigrade, and preferably lower than the same by an amount of 1–20 degrees centigrade as a difference. Should the temperature difference be smaller than one (1) degree centigrade, it is likely that droplets of water or other liquid will be deposited on the polymer film 26 upon small changes in the condition of the process of the casting. Should the temperature difference be greater than 20 degrees centigrade, the manufacturing cost will be too high in an unwanted manner. It is to be noted that a non-contact type of thermometer or temperature sensor 32 is used for measuring the surface temperature in the vicinity of a measuring point 26a indicated in FIG. 2. Of course, a method of measurement different from this can be used. Also, it is preferable that the solvent withdrawing device 31 adjusts the temperature of the condensing surface 31a according to the measured temperature in the thermometer 32.

In FIG. 1, there are a tenter chamber 60 and a drying chamber 61 disposed downstream from the casting chamber 20 for the purpose of further drying the polymer film 26. A tenter drying device 62 is disposed in the tenter chamber 60. While the polymer film 26 is extended by a tenter in its width direction, the tenter drying device 62 dries the polymer film 26. This is preferable to uniformize surfaces of the polymer film 26. A considerable number of rollers 63 are disposed in the drying chamber 61, into which the polymer film 26 is fed. The polymer film 26 is engaged with the periphery of the rollers 63, and dried while fed. Also, a cooling chamber 64 is used to cool the polymer film 26 down to approximately the room temperature. After this, a film winder 65 is actuated to wind up the polymer film 26. It is to be noted that the polymer film 26 may be subjected to cutting of selvedges, forming of knurling, or other additional working. The film producing line 10 used in the present invention may constructed differently from that depicted in FIGS. 1–3.

The solution casting process of the invention is preferable for producing the polymer film of a small thickness of 20–120 microns because of highness of the polymer film stress occurring upon the stripping operation. Note that the thickness of the polymer film for which the solution casting process of the invention is effective is preferably 20–65 microns, and desirably 20–45 microns.

The polymer film 26 described herein can be used as optical film or protective film on a polarizing plate. Also, such a polarizing plate protective film can be attached to each of two surfaces of a polarizing film formed from polyvinyl alcohol or other polymers, so as to construct a polarizing plate. Further examples of uses of the polymer film 26 include an optical compensation film, anti-reflection film, and the like. The optical compensation film includes the polymer film 26 and an optical compensation sheet attached to the polymer film 26. The anti-reflection film includes the polymer film 26 and an anti-glare layer overlaid thereon. A liquid crystal display panel or display device can be constructed by use of such film.

Although only one layer of the dope 12 of one type is cast according to the embodiment of FIG. 1, other structures for casting may be used. For example, the casting may be a combination casting method in which plural types of dopes are used. A feed block may be positioned upstream from the casting die. A plurality of types of dopes can be supplied into the feed block, in which the types of dopes can be redirected as one flow for the purpose of casting. In the embodiment of the drawing, the rotary drum 22 is used as a support.

However, it is possible to use a support belt in an endless form as a support of casting. Rotatable rollers are engaged with the inside of the belt, and turn the support belt endlessly, for the purpose of casting the dope on the support belt for the solution casting.

EXAMPLES

Preferred examples of the invention are hereinafter described. At first, preparation of the dope for use in the experiments is described. Experiment 1 was conducted for observing stability in stripping of the gel film from the rotary drum. For Experiment 1, details of the condition are described with Example 1. Portions of the condition in Examples 2, 3, 4 and 5 and Comparative example 1 the same as those of Example 1 are not described. Results in relation to the condition are indicated in Table 1. Then Experiment 2 was conducted for observing occurrence of dew condensation on the polymer film and the rotary drum. Specifically, portions of the condition in Experiment 2 the same as those of Experiment 1 are not described. For Experiment 2, details of the condition are described with Example 6. Portions of the condition in Example 7 and Comparative examples 2, 3 and 4 the same as those of Example 6 are not described. Results in relation to the condition are indicated in Table 2.

[Preparation of Dope]

To prepare the dope, mixed solvent was used, and included:

Methyl acetate, 85 wt. %
Acetone, 5 wt. %
Ethanol, 5 wt. %
n-butanol, 3 wt. %.

To the mixed solvent, the following solutes were added according to one known preparation method:

Cellulose triacetate (TAC) with a ratio of acetylation of 59.6%, 26.8 parts by weight
Triphenyl phosphate (TPP), 2.1 parts by weight
Biphenyl diphenyl phosphate (BDP), 1.1 parts by weight.

The dope had viscosity of 100 Pa·s at the temperature of 30° C., storage elastic modulus of 12,000 Pa at the temperature of −5° C., and had the density of the solid component of 23 wt. %. Note that the numbers of parts by weight of the solutes herein referred to are used relative to the total of the mixed solvent as 100 parts.

Experiment 1

Example 1

The film producing line 10 was used to form polymer film. The flow casting die 21 was a die of a coat hanger type. A surface of the rotary drum 22 was finished according to the mirror surface finish in order to impart a surface roughness of 0.04 S to the rotary drum 22. A surface temperature of the rotary drum 22 was kept at −20° C. by supplying the same with coolant from the coolant supply device 45. To set the peripheral speed ratio V1/V0=1.1, the peripheral speed V0 of the rotary drum 22 was 100 meters per minute. The peripheral speed V1 of the stripping roller 25 was 110 meters per minute. The clearance C1 between the rotary drum 22 and the stripping roller 25 was 5 mm. The anti-condensation gas 28 was blown at a flow rate of 1 m/s at a temperature of 35° C. The heating gas 30 was blown at a flow rate of 5 m/s at a temperature of 80° C. The warming gas 48 and 49 was blown at a flow rate of 5 m/s at a temperature of 25° C.

After the setting of the above condition, the dope 12 at 30° C. was cast on the rotary drum 22 in a state to obtain 80 microns of a thickness of the polymer film 26 after being dried. The film stress at the time of stripping the gel film 24 with the stripping roller 25 was measured by the above-mentioned method, and determined to be 500,000 Pa. The gel film 24 was observed and checked by human eyes. As a result, no upper shift of the stripping line was found, and no occurrence of non-stripped remainder was found. This is indicated by the sign A in the table. Then the polymer film 26 was dried by the tenter drying device 62 at 135° C. for three (3) minutes, and then dried in the drying chamber 61 at 135° C. for 10 minutes, and cooled in the cooling chamber 64 at 80° C. for one (1) minute. Finally, the polymer film 26 was wound by the film winder 65. The surface of the polymer film 26 was observed by human eyes, and found to have very high smoothness.

Examples 2–5

Polymer film was produced in the same condition as Example 1 except for the partial items indicated in Table 1. As a result, the suitability for stripping in Example 2 was very good, as indicated by the sign A. In Examples 3–5, a small remaining film without being stripped and an upper shift of the stripping line were observed, but were so small that no influence occurred to the continuous casting, as indicated by the sign B.

Comparative Example 1

Polymer film was cast and produced in the same condition as Example 1 except for the partial items indicated in Table 1. As a result, in Comparative example 1, a considerable remaining film without being stripped on the rotary drum 22 and somewhat upper shift of the stripping line were observed, as indicated by the sign F.

TABLE 1

|  | Ex. 1 | Ex. 2 | Ex. 3 | Ex. 4 | Ex. 5 | Comp. Ex. 1 |
|---|---|---|---|---|---|---|
| Casting speed V0 (m/min.) | 100 | 150 | 50 | 80 | 80 | 100 |
| Drum temperature (° C.) | −20 | −15 | −30 | −30 | −60 | −5 |
| Stress of film upon stripping (×10³Pa) | 500 | 600 | 600 | 600 | 450 | 350 |
| Ratio between peripheral speeds (V1/V0) | 1.1 | 1.1 | 1.0008 | 1.08 | 1.08 | 1.0008 |
| Clearance C1 (mm) | 5 | 5 | 5 | 110 | 5 | 110 |
| Surface energy difference (×10⁻²N/m) | 4.0 | 3.7 | 4.5 | 4.5 | 2.8 | 2.5 |
| Evaluation of stripping | A | A | B | B | B | F |

TABLE 1.1

| Occurrence of upper shift of stripping line, & occurrence of non-stripped remainder | Evaluation of stripping |
|---|---|
| None | A |
| Found but not harmful | B |
| Found & harmful | F |

Experiment 2

Example 6

The rotary drum 22 for the casting was the same as that for Example 1. Coolant was supplied by the coolant supply device 45 into the rotary drum 22, to keep the surface of the rotary drum 22 at −30° C. The peripheral speed V0 of the rotary drum 22 or speed of casting was 80 meters per minute. The peripheral speed V1 of the stripping roller 25 was 86.4 meters per minute, so as to determine the ratio V1/V0 as 1.08. The clearance C1 between the rotary drum 22 and the stripping roller 25 was 80 mm.

In Example 6, the anti-condensation gas 28 was blown at a flow rate of 0.8 m/s at a temperature of 35° C. The solvent withdrawing device 31 was set up for setting the dew point of the drying air 19 for the polymer film at −32° C. The warming gas 48 and 49 was blown at a flow rate of 10 m/s over the rotational shafts 40 and 41 and the bearings 42 and 43 with the drying gas dew point of −32° C.

To produce the polymer film by casting, the dope 12 of 30° C. was used. The casting speed V0 was 80 meters per minute. The casting was conditioned to impart a thickness of 80 microns to the polymer film after drying. Density of gas at the bead back surface 23b was measured by gas chromatography, and determined as 0.7 vol. %. Temperature of the standby region 22c was measured by the non-contact type of the thermometer or temperature sensor, and determined as −30° C. The film stress at the time of stripping of the gel film 24 from the rotary drum 22 was 600,000 Pa. As a result, no occurrence of dew condensation was observed on the rotary drum 22, as indicated by the sign A in the table. No deposition of droplets of water or solvent was found on the surface of the polymer film, as indicated by the sign A in the table.

Example 7

The polymer film was formed according to the same condition as Example 6 except for the partial items indicated in Table 2. As a result, no dew condensation was found on the rotary drum 22, as indicated by the sign A. No dew condensation was found on the obtained polymer film, as indicated by the sign A. Furthermore, a good result was obtained in relation to a surface smoothness of the polymer film.

Comparative Examples 2–4

The polymer film was formed according to the same condition as Example 6 except for the partial items indicated in Table 2. As a result, in Comparative example 2, dew condensation was found on the rotary drum 22, as indicated by the sign F. No dew condensation was found on the obtained polymer film, as indicated by the sign A. In Comparative example 3, dew condensation was found on the rotary drum 22, as indicated by the sign F. No dew condensation was found on the obtained polymer film, as indicated by the sign A. In Comparative example 4, no dew condensation was found on the rotary drum 22, as indicated by the sign A. In contrast, dew condensation was found on the obtained polymer film, as indicated by the sign F. It is concluded that at least one of the rotary drum 22 and the obtained polymer film came to have dew condensation as indicated by the sign F. The continuous casting was influenced remarkably. Furthermore, poor surface smoothness of the polymer film was obtained according to any of the three Comparative examples as a result of observation with human eyes.

TABLE 2

|  | Ex. 6 | Ex. 7 | Comp. Ex. 2 | Comp. Ex. 3 | Comp. Ex. 4 |
|---|---|---|---|---|---|
| Gas density around bead (vol. %) | 0.7 | 10 | 1 | 10 | 10 |
| Flow rate of anti-condensation gas 28 (m/s) | 0.8 | — | 0.2 | — | — |
| Temperature of standby region 22c (° C.) | −30 | 20 | −30 | −30 | 20 |
| Flow rate of heating gas 30 (m/s) | — | 8 | — | — | 8 |
| Dew point after withdrawing solvent (° C.) | −32 | −32 | −32 | −32 | −25 |
| Dew condensation on drum | A | A | F | F | A |
| Dew condensation on polymer film | A | A | A | A | F |

TABLE 2.1

| Meanings | Signs |
|---|---|
| No blow of gas | — |
| No dew condensation | A |
| Dew condensation found | F |

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A solution casting process comprising steps of:
 casting dope including polymer and solvent on a support in a form of a bead of said dope by use of a flow casting die, to form gel film;
 stripping said gel film from said support by use of a stripping roller, to obtain polymer film; and
 cooling a surface of said support at −10° C. or lower.

2. A solution casting process as defined in claim 1, wherein said support is constituted by a rotary drum;
 in said cooling step, anti-freezing heat medium is used and caused to flow in a flow path formed through said rotary drum.

3. A solution casting process as defined in claim 2, wherein said anti-freezing heat medium is coolant of at least one of a glycol type, a fluorine type, and an alcohol type.

4. A solution casting process as defined in claim 1, wherein said support is formed from material with low-temperature brittleness.

5. A solution casting process as defined in claim 1, further comprising a step of blowing anti-condensation gas over a bead back surface of said bead, to lower density of gaseous solvent gasified from said solvent on said gel film in a vicinity of a landing line where said bead is landed to said support, so as to suppress condensation of said gaseous solvent on said support.

6. A solution casting process as defined in claim 5, wherein a temperature of condensation of said gaseous solvent is set lower than a temperature of said support by at least 1° C.

7. A solution casting process as defined in claim 5, wherein said anticondensation gas is nitrogen or helium.

8. A solution casting process as defined in claim 5, wherein said anti-condensation gas flows at a flow rate of 0.5–2 m/s.

9. A solution casting process as defined in claim 5, further comprising a step of blowing heating air over a standby region that is defined on said support without said gel film and between a landing line where said bead is landed to said support and a stripping line where said gel film is stripped from said support, for setting a temperature of said standby region higher than a temperature of condensation of vapor in atmosphere or said gaseous solvent.

10. A solution casting process as defined in claim 9, wherein said heating air has a temperature of 50–100° C.

11. A solution casting process as defined in claim 9, further comprising a step of condensing and withdrawing said gaseous solvent at a predetermined temperature that is set lower than a surface temperature of said polymer film by at least 1° C.

12. A solution casting process as defined in claim 9, wherein said support is rotatable about a rotational shaft; further comprising steps of:
cooling said support with coolant; and
blowing warming air over said rotational shaft or a vicinity thereof in said support, for setting a temperature of said rotational shaft higher than a temperature of condensation of said vapor or said gaseous solvent.

13. A solution casting process as defined in claim 12, wherein said stripping roller strips said gel film from said support at film stress of 450,000 Pa or more.

14. A solution casting process as defined in claim 12, wherein said support and said stripping roller satisfy a condition of:

$$1.001 \leq V1/V0 \leq 1.5$$

where $V0$ is a peripheral speed of said support, and $V1$ is a peripheral speed of said stripping roller.

15. A solution casting process as defined in claim 12, wherein said support and said stripping roller satisfy a condition of:

$$1 \text{ mm} \leq C1 \leq 100 \text{ mm}$$

where $C1$ is a clearance between said stripping roller and said support to strip said gel film.

16. A solution casting process as defined in claim 12, wherein a difference in surface energy between said support and said dope is $3 \times 10^{-2}$ N/in or more.

17. A solution casting process comprising steps of:
casting dope including polymer and solvent on a support in a form of a bead of said dope by use of a flow casting die, to form gel film;
stripping said gel film from said support by use of a stripping roller, to obtain polymer film; and
blowing anti-condensation gas over a bead back surface of said bead, to lower density of gaseous solvent gasified from said solvent on said gel film in a vicinity of a landing line where said bead is landed to said support, so as to set a temperature of condensation of said gaseous solvent lower than a temperature of said support by at least 1° C.

18. A solution casting process as defined in claim 17, wherein said anti-condensation gas is nitrogen or helium.

19. A solution casting process as defined in claim 17, wherein said anti-condensation gas flows at a flow rate of 0.5–2 m/s.

20. A solution casting process as defined in claim 19, wherein said anti-condensation gas has a temperature of 30–50° C.

21. A solution casting process comprising steps of:
casting dope including polymer and solvent on a support in a form of a bead of said dope by use of a flow casting die, to form gel film;
stripping said gel film from said support by use of a stripping roller, to obtain polymer film; and
blowing heating air over a standby region that is defined on said support without said gel film and between a landing line where said bead is landed to said support and a stripping line where said gel film is stripped from said support, for setting a temperature of said standby region higher than a temperature of condensation of vapor in atmosphere or gaseous solvent gasified from said solvent on said gel film.

22. A solution casting process as defined in claim 21, wherein said heating air has a temperature of 50–100° C.

23. A solution casting process as defined in claim 21, further comprising a step of condensing and withdrawing said gaseous solvent at a predetermined temperature that is set lower than a surface temperature of said polymer film by at least 1° C.

24. A solution casting process comprising steps of:
casting dope including polymer and solvent on a support in a form of a bead of said dope by use of a flow casting die, to form gel film;
stripping said gel film from said support by use of a stripping roller, to obtain polymer film; and
condensing and withdrawing gaseous solvent from said solvent gasified on said gel film at a predetermined temperature that is set lower than a surface temperature of said polymer film by at least 1° C.

25. A solution casting process as defined in claim 24, wherein said support is rotatable about a rotational shaft; further comprising steps of:
cooling said support with coolant; and
blowing warming air over said rotational shaft or a vicinity thereof in said support, for setting a temperature of said rotational shaft higher than a temperature of condensation of vapor in atmosphere or gaseous solvent gasified from said solvent on said gel film.

26. A solution casting process comprising steps of:
casting dope including polymer and solvent on a rotatable support in a form of a bead of said dope by use of a flow casting die, to form gel film;
stripping said gel film from said support by use of a stripping roller, to obtain polymer film;
cooling said support with coolant; and
blowing warming air over a rotational shaft of said support or a vicinity thereof in said support, for setting a temperature of said rotational shaft higher than a temperature of condensation of vapor in atmosphere or gaseous solvent gasified from said solvent on said gel film.

27. A solution casting process as defined in claim 26, wherein said warming air has a temperature of 20–30° C.

* * * * *